March 11, 1969    J. H. MOSTERD    3,432,034
WEIGHT SORTING MACHINE

Filed Sept. 14, 1966    Sheet _1_ of 5

INVENTOR
JACOB HENDRIKUS MOSTERD

BY *Gordon H. Hueschen*

ATTORNEY

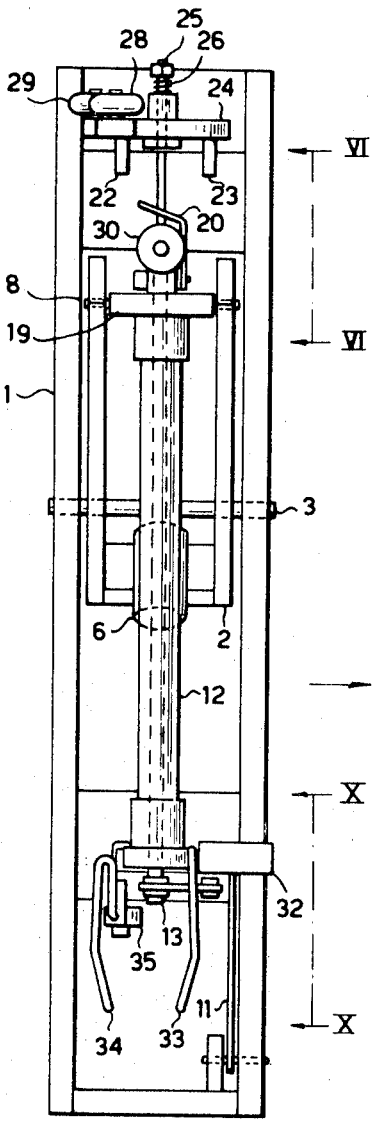

March 11, 1969 J. H. MOSTERD 3,432,034
WEIGHT SORTING MACHINE
Filed Sept. 14, 1966 Sheet 3 of 5
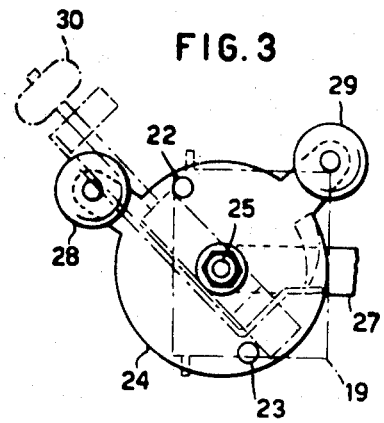
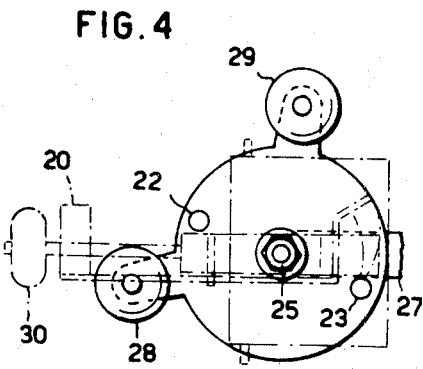
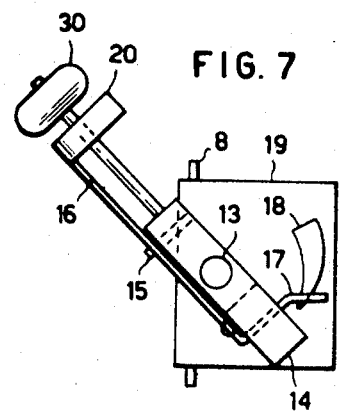
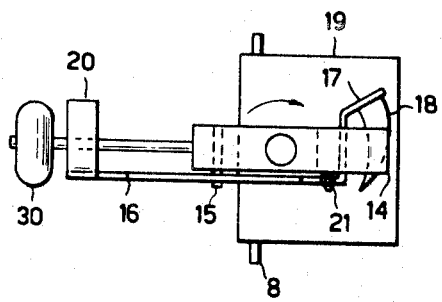
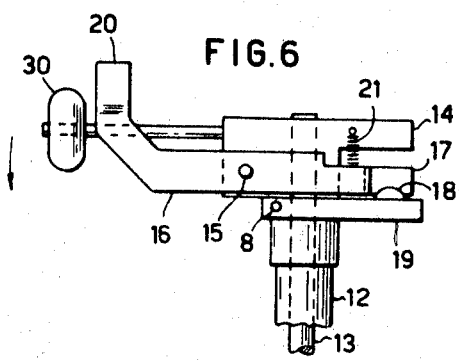
INVENTOR
JACOB HENDRIKUS MOSTERD
ATTORNEY March 11, 1969 J. H. MOSTERD 3,432,034
WEIGHT SORTING MACHINE
Filed Sept. 14, 1966

INVENTOR
JACOB HENDRIKUS MOSTERD
BY
ATTORNEY

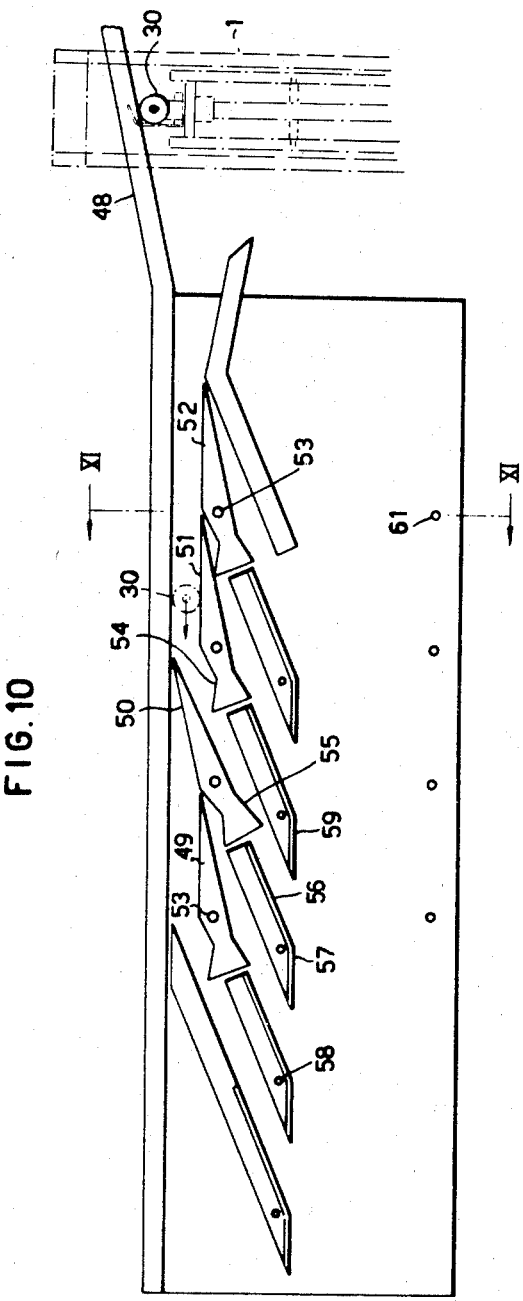

United States Patent Office 3,432,034
Patented Mar. 11, 1969

3,432,034
WEIGHT SORTING MACHINE
Jacob H. Mosterd, Barneveld, Netherlands, assignor to Apparatenbouw "MOBA" N.V., Barneveld, Netherlands
Filed Sept. 14, 1966, Ser. No. 579,332
Claims priority, application Netherlands, Sept. 16, 1965, 6512100
U.S. Cl. 209—73    10 Claims
Int. Cl. B07c 5/16; B07b 13/08

ABSTRACT OF THE DISCLOSURE

A machine for weight-sorting objects, as for example eggs, provided with at least one weighing device, means for substantially horizontally moving the weighing device along a track, guides each of which has a downwardly sloping portion mounted near the track, the forward ends of the guides being at different heights, each weighing device being provided at its lower end with a gripper adapted to assume either an open or a closed position, the gripper being coupled to a member which in the closed position of the gripper can cooperate with a guide, and which upon movement of the gripper from the closed to the open position is pivoted away from a related guide.

---

Figure 1:
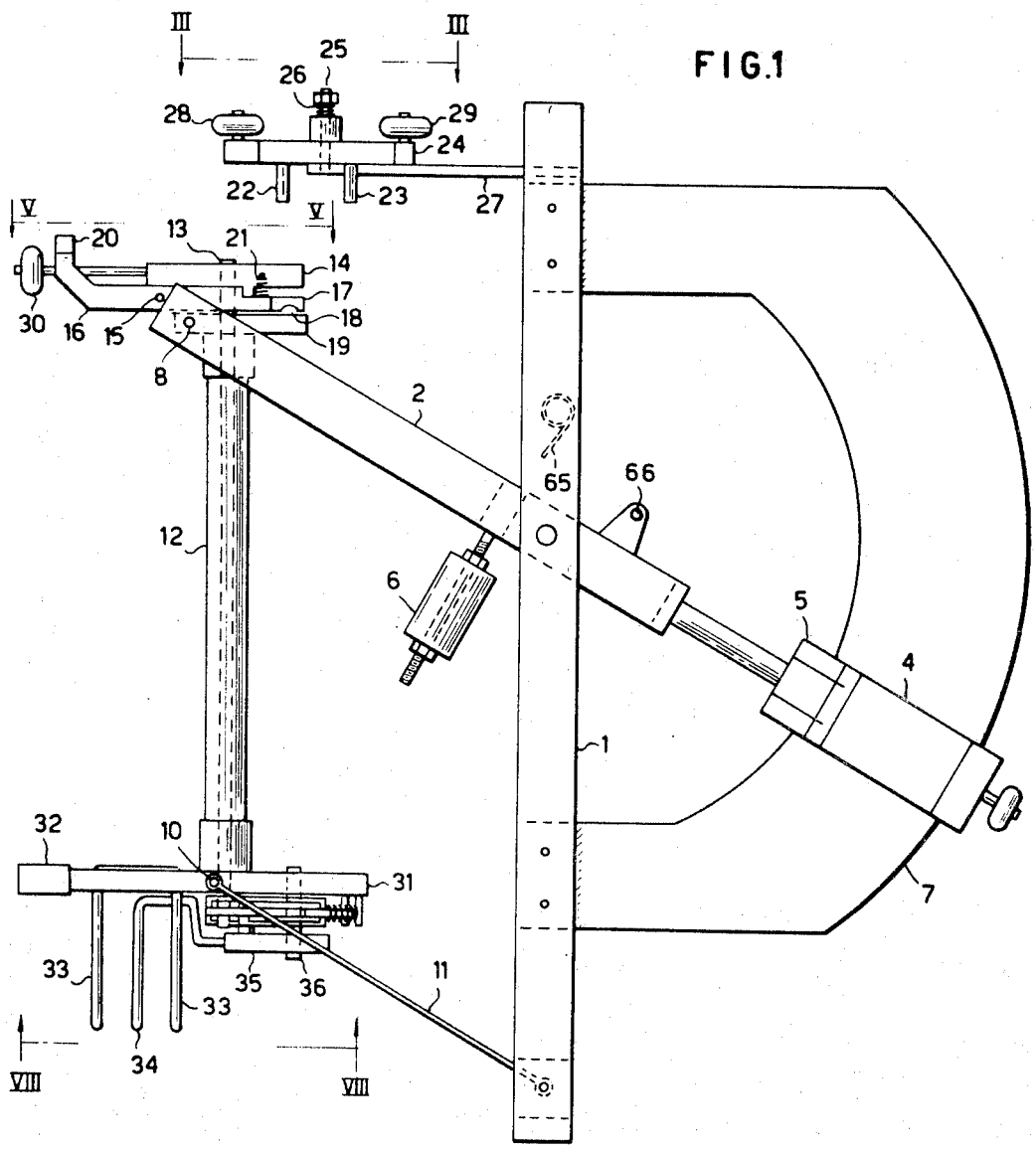

The invention relates to a machine for weight sorting objects, more especially but not exclusively eggs, in which the objects are put into a weighing device and are discharged in dependence on their weight in one out of a number of discharge stations.

It is an object of the invention to provide a machine of this type which allows a high work speed and in which the objects when discharged need only to fall a very small distance.

Accordingly the invention provides a device having weighing devices which move along a fixed track along which track guides have been provided, which can cooperate with weighing devices, which in dependence on the weight of the object to be sorted carried by each of them attain a position within a certain region of positions, which guides slope downwardly until the objects in the weighing devices are very near above a discharge station. Because the weighing devices have ample time to adjust themselves and this time period practically is independent of the speed of the machine, it is possible to obtain high working speeds with the invention, combined with accurate weight measurements. Further the sloping-down configuration of the guides allows to limit the falling height, so that also the falling height does not limit the performance of the machine.

When applying the invention with high working speeds it is of great importance, that the objects are positively gripped but on the other hand it is also of importance that the gripping means, e.g. a gripper, with certainty does not hit an object discharged earlier. In order to obtain these features according to the invention it is further provided, that the weighing device at its lower side is provided with a gripper for an object and a pivot mechanism for the member, that cooperates with the guide, which mechanism cooperates in such a way with the gripper, that with movement from the closed to the opened position of the gripper the said member is pivoted away from the guide.

A further improvement of this is possible by providing a spring which in the lowest position of the weighing device biases the weighing device upwardly.

An embodiment of the above feature which in practice is satisfactory and with simple means allows a sufficient working speed consists in that the member, which cooperates with the guide is pivotable about a horizontal axis and in that a locking mechanism, which can cooperate with the guide, is pivotably mounted about a vertical axis and can cooperate with a fixed abutment mounted along the track of the weighing device. For closing the gripper when receiving an object control members for the gripper are mounted to the weighing device, which control members are adapted to cooperate with guides or cams, that are fixedly mounted along the track of the weighing devices. In order to prevent the control members of the gripper from influencing the weight measurement, according to a further elaboration of the invention there is provided, that an adjustment member cooperates with the weighing device in such a way, that it, together with follow members, which can cooperate with guides that are fixedly mounted along the track of the weighing device, can close the gripper after which all mechanical engagements between the adjustment member and the weighing device proper which engagements could induce friction forces of the weighing part of the weighing device are eliminated.

A reliable and very simple solution for discharging objects with high speed in juxtapositioned locations, consists according to a further elaboration of the invention in that each discharge station is provided with a number of switching slaps, which are provided at their upper and their lower sides respectively with abutment surfaces, which are so positioned in the track of the member cooperating with the guide, that a switching slap which is in the working position, is brought into the rest position and a more forwardly positioned switching slap is brought from the rest position in the working position by the passage of said member.

Herewith it is possible to attain that an object, that has to be carried to the most distant discharge station moves with ample spacing above the objects already discharged, because past each switching slap a guide sloping downwardly is present.

When applying the invention the weighing devices move along a fixed track. Experience has shown that this may generate oscillations, which could affect the weighing measurement. In order to eliminate this disadvantage according to a further elaboration of the invention it is provided that the weighing device has a damping member existing of a permanent magnet and an electrically well-conducting part, which magnet and part are movable with respect to each other.

When applying the invention the position of the weighing device determines with which guide it will cooperate. Theoretically it is possible that a weighing device will hit exactly the forward end of a guide, which could induce shocks and disturbances.

In order to obviate this, according to a further elaboration of the invention it is provided that each weighing device bears a permanent magnet and that at the location of the forward end of each guide a further permanent magnet is mounted, which magnets are polarized such, that it is obviated that the member of the weighing device that cooperates with the guide hits the forward end of the guide.

The invention is elucidated by means of the accompanying drawing.

Figure 8:
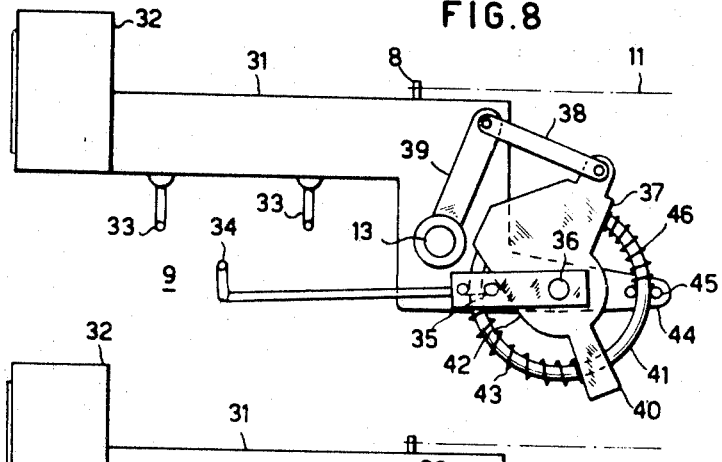
Figure 9:
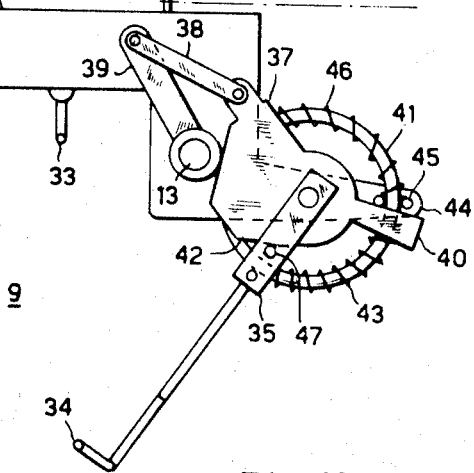
Figure 11:
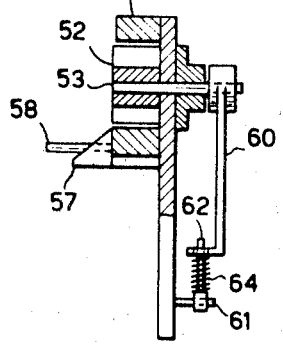

In the drawing shows:
FIGURE 1 a weighing device in side-elevation;
FIGURE 2 a front elevation of FIGURE 1;
FIGURE 3 a plan view of a detail of FIGURE 1;
FIGURE 4 a view analogue to FIGURE 3 in another position;
FIGURE 5 a view in the direction of the arrows V of FIGURE 1;
FIGURE 6 a side elevation of a detail of FIGURE 5;
FIGURE 7 a view analogous to FIGURE 5, but in another working position;
FIGURE 8 a view in the direction of the arrows VIII—VIII of FIGURE 1;
FIGURE 9 the same view in another position;

FIGURE 10 an elevation of a discharge station;

FIGURE 11 a cross-section over the line XI—XI of FIGURE 10; and

Figure 12:
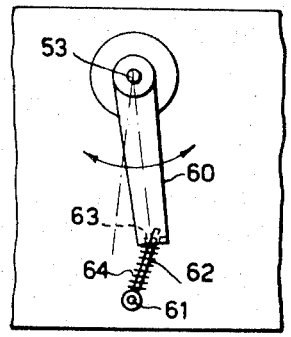

FIGURE 12 a detail of a back elevation of the device according to FIGURE 10.

The weighing device shown in FIGURES 1–9 inclusive consists of a supporting frame 1, which is mounted to a horizontal transport chain (not shown) which can move in a direction perpendicular to the plane of drawing of FIGURE 1. In this frame a weighing beam 2 is pivotally mounted about an axis 3. The weighing device is adjusted by means of a counterweight 5 provided with permanent magnets 4 and an adjustment weight 6. The magnets 5 of the counterweight 6 move along a sheet 7 of well-conducting material, e.g. copper, for obtaining a good oscillation damping. Pivoting about taps 8, a self-discharging egg gripper 9 is mounted to the weighing beam 2, which gripper at its lower side at 10 is coupled to the supporting frame 1 by means of a link 11.

The egg gripper 9 is provided with a vertical column 12, in which a control rod 13 rotatably is mounted. At its upper side this control rod 13 is fixedly connected to a lever 14. Pivoting about a horizontal pin 15, a locking pawl 16 is connected to the lever 14. One end 17 of the pawl 16 can cooperate with a cam rib 18, which protrudes from a supporting plate 19 whereas the other end of the pawl is provided with a sloping lip 20. By means of a pressure spring 21 the pawl 16 is kept in the position shown in FIGURES 1, 5 and 6 in which the pawl is retained by perpendicular back side of the cam rib 18.

If in FIGURE 1 the weighing beam 2 has been rotated clockwise as far as possible, the lever 14 is positioned between two pins 22 and 23, which are mounted to a control member in form of a disc 24, that by means of a shaft 25 can rotate and frictionally is braked by means of a pressure spring 26. The shaft 25 is supported by a fixed arm 27 mounted to the frame 1. The disc 24 bears at its upper side two freely rotatable control rollers 28 and 29. These control rollers 28 and 29 can cooperate with cams (not shown) which are fixedly positioned along the track of movement of the frame 1. The lever 14 supports a roller 30 that is the member that can cooperate with guides positioned along the track of the weighing devices, as will be discussed further on. Disc 24 can by means of pins 22 and 23 be rotatably coupled to lever 14.

At its lower side the column 12 supports a plate 31 at the lower side of which the egg gripper 9 has been mounted. At the end of the plate 31 a permanent magnet 32 is mounted.

The egg gripper 9 contains two fixed bent pins 33 and a movable bent pin 34, which is connected to a pivot arm 35, which freely can pivot about a pivot 36. Also freely rotatable on pin 36, a crank member 37 is provided, which, via a link 38, is connected to a crank lever 39, which crank lever fixedly is connected to the vertical shaft 13.

The member 37 is provided with an arm 40, a ring 41, that is coaxially to the pin 36 and a cam surface 42. Between the arms 40 and 35 a pressure spring 43 is mounted on the ring 41. In the same way a pressure spring 46 is mounted between the pins 45 mounted to an arm 44 of the plate 31 and the member 37. Further in arm 35 a pin 47 is mounted, which engages the cam surface 42 of the member 37.

In FIGURES 8 and 9 the two extreme positions of the egg gripper 9 have been shown. When switching from the position of FIGURE 9 to that of FIGURE 8 the shaft 13 rotates clockwise by reason of which the member 47 is also rotated clockwise via lever 39 and link 38, so that the arm 40 pushes spring 43 forward. The cam surface 42 moves with the member 37, so that the arm 35 by spring 43 can be moved to the closed position, because pin 47 is not stopped by cam surface 42. In this way a resilient gripping action is obtained between the pins 33 on the one hand and the pin 34 on the other hand. Spring 46 serves the purpose of rotating the shaft 13 counter clockwise via the links 38 and 39 when the locking mechanism applied at the upper end of shaft 13 allows such movement.

After an egg has been gripped in the egg gripper 9 the weighing beam 2 positions itself in accordance with the weight of the egg. After this the weighing beam moves towards a number of guides each of which is positioned at a different height and each of which connects to a different discharge station. The magnet 32 prevents the roller 30 from hitting the forward end of a guide, because, at the location of the forward guide ends, permanent magnets (not shown) are mounted repelling magnet 32 and driving it somewhat upwardly or downwardly such that the axis of roller 30 is somewhat above or below the fore end of the guide.

In FIGURE 10 a set of discharge stations has been indicated. The end of one of the guides, under which the roller 30 comes in dependence of the weight of the egg, is indicated by 48. Of four switching slaps 49, 50, 51 and 52 the second one is in the working position and the others are in the rest position. They all can pivot about pins 53. The roller 30 when moving from the right to the left engages the under side of the slap 50. The roller 30 is guided downwardly and engages the upper oblique surface 54 of the preceding slap 51 and switches it in the working position, which corresponds to position of slap 50 that has been shown in the drawing. When the roller 30 further moves along the lower side of slap 50, it engages the lower oblique surface 55 of this slap 50, by reason of which it is rotated back unto the rest position. After this the roller 30 comes under a guide 56, of which the end 57 is horizontally positioned, whereas a fixed pin 58 engages the sloping lip 20 of the weighing device, which consequently discharges the egg from the gripper. The following roller 30 engages slap 51 at its lower side, positions slap 52 in the working position and repositions slap 51 in the rest position. The egg is discharged at the guide part 59. After this slap 52 is returned to its working position when a further roller engages its lower oblique control surface. When all slaps are in the rest position and the next roller is guided downwardly by the most lefthand fixed guide, it pivots slap 49 to the working position. Consequently it will be clear that always five eggs are discharged the one after the other from left to right and that then again the next egg is discharged at the most lefthand discharge location. It is important that the roller 30 remain at a relatively high level, i.e. the level of the upper side of slaps 49–52 so that an egg contained in a gripper moving towards the most lefthand discharge location will not engage the egg trays for receiving the eggs or eggs already present in said trays.

The slaps 49–52 are always stabilized in either their working or rest position by means of an arm 60 mounted at the back side of the discharge station which arm cooperates with rod 62 that freely can pivot about a pin 61 and that is inserted in a hole 63 in the angled end of arm 60, and a pressure spring 64 surrounding rod 62.

The guides 56 and 57 protrude more in the lefthand direction in FIGURE 11 the lower they come, because the weighing device, when it is pressed down by the guide roller 30 pivots by reason of which roller 30 moves more towards the frame 1.

The working of the described device is the following: In the beginning the weighing devices run along a track in which the guide roller 30 is maintained in its highest position, because the gripper does not contain any object so that the pins 22–23 can cooperate with the arm 14. When the egg gripper 9 is open, the device shown in FIGURES 5, 6 and 7 is in the position of FIGURE 7. Because the weighing device is in its highest position the arm 14 is positioned between the pins 22–23, and, when the roller 30 engages a suitable cam guide (not shown), the arm 14 is moved from the position shown in FIGURE 7 to that of FIGURE 4 by means of the disc 24.

Simultaneously the egg gripper 9 moves from the position of FIGURE 9 to that of FIGURE 8 and an egg can be gripped between the pins 33 and 34. After this the roller 28 engages a guide (not shown), by reason of which the disc 24 is rotated back into the position of FIGURE 3 and the arm 14 is completely made free from the pins 22–23. The weighing device adjusts itself in a position dependent on the weight of the egg in the gripper and moves further on to the discharge stations, in which finally the roller 30 comes below a guide 48. The forward ends of these guides, such as 48, are placed on different heights, so that under each of the guides 48 the rollers 30 of weighing devices come, containing an egg of a predetermined weight class. The roller 30 moves then via a slap 49–52 and a guide 56 to a horizontal guide 58, the lip 20 engaging a pin 58, so that pawl 16 pivots about pivot pin 15 by reason of which the back end of 16 is not further retained by the cam rib 18. Spring 48 pivots arm 14 into the position shown in FIGURE 7 so that the roller 30 is pivoted away from the guide 57 and the egg gripper 9 opens. Because the weight of the egg does not further influence the weighing device, this device moves upwardly which happens so fast, that a precedingly discharged egg is not hit by the pins 33 or 34. The upward movement of the weighing device of course can be accelerated by using a spring, such as 65, which can cooperate with an abutment 66 (FIGURE 1), and which biases the weighing device upwardly, but exclusively in the lower region of its movements, so that this spring does not affect the weight measurement.

After an egg has been discharged, the weighing device 9 again comes to its upper position, so that the arm 14 again comes between the pins 22–23. When the weighing device, which normally is mounted on an endless chain (not shown), again reaches the location where an egg can be gripped, the egg is gripped and all repeats itself in the described way.

A special advantage of the weighing device according to the invention is that the weighing device immediately moves upwardly after discharging an egg which enables the apparatus to minimize the falling height of the eggs. This again enables the working speed of the machine to be increased, without introducing the possibility of faulty discharging eggs.

In view of the high working speed it may be desired to use a larger number of slaps than five, e.g. with trays in which six eggs can be placed, a number of twelve slaps. Then it is very easy to obtain sufficient time for replacing the egg trays, because an egg is kept on a relatively high level during a considerable length of the track to be followed by the weighing device at the moment a tray has to be replaced.

The embodiment of the invention shown in the drawings and described more particularly above, relates to an egg handling sorting machine. It will, however, be clear, that the same principles and advantages can be obtained when sorting other objects, especially but not exclusively if these objects are liable to break as easily as eggs.

What I claim is:

1. Machine for weight sorting objects, provided with at least one weighing device, means for substantially horizontally moving said weighing device along a track, guides each having a downwardly sloping portion mounted near said track, the forward ends of the guides being at different heights, each weighing device being provided at its lower end with a gripper adapted to assume an open or a closed position, a guide engaging member pivotally coupled to said gripper adapted to cooperate with said guides when said gripper is in the closed position and adapted to pivot away from said guides upon movement of said gripper from the closed to the open position.

2. Machine according to claim 1 in which mechanical biasing means are present to bias the weighing device upwardly when it is in its lowest position.

3. Machine according to claim 1 in which the pivot axis of the pivot mechanism is vertical and in which each weighing device is provided with a locking mechanism for locking said member in a first position, whereas further the weighing device is provided with an unlocking abutment, non-movable abutments being mounted along the track of the weighing device such that they can cooperate with the unlocking abutment in order to unlock the locking mechanism.

4. Machine according to claim 1 in which the gripper is provided with a lever, that is pivotably mounted about a vertical axis, spring biasing means for biasing the lever in the closing direction of the gripper, and a movably mounted control member, coupled to the lever for opening the gripper when moving in one direction and for resiliently allowing it to close when moving in the opposite direction.

5. Machine according to claim 1 provided with a control member which is mounted for engagement with the pivot mechanism when the weighing device is in a first position and which is free from the weighing device in all its other positions, which control member is provided with follow members, near the track of the weighing device, cams being fixedly mounted for cooperation with the follow members.

6. Machine according to claim 1 provided with a discharge station at the end of each guide, which stations are each provided with a number of pivotably mounted switching slaps, which slaps are mounted for a limited pivot movement between two extreme positions, the working position and the rest position, said slaps at their upper and lower sides respectively being provided with cam surfaces, which slaps are positioned in such a way in the path of the member of the weighing device that they can cooperate with the guide, the arrangement being such that a switching slap, which before the passage of said member (30) was in its working position, is, upon passage of said member, put into a rest position and that a switching slap positioned preceding the above-mentioned slap is put from its rest position into its working position.

7. Machine according to claim 6 in which a mechanism is present for each slap which mechanisms each are provided with means urging the slaps, when their position is near to the working or the rest position, into the working or the rest position respectively.

8. Machine according to claim 6 in which beyond each switching slap a downwardly sloping guide portion is present.

9. Machine according to claim 1 in which each weighing device is provided with a damping member, consisting of a permanent magnet and an electrically well-conducting part, which are movable with respect to each other.

10. Machine according to claim 1, in which each weighing device is provided with a permanent magnet and at the location of the forward end of the guide further permanent magnets are mounted, which magnets are so polarized that a magnet supported by a weighing device is repelled by a fixedly mounted magnet, the arrangement being such that the member of the weighing device that can cooperate with a guide is prevented from hitting the forward end of a guide.

References Cited

UNITED STATES PATENTS 3,100,571   8/1963   Reck et al. _____ 209—121

ALLEN N. KNOWLES, *Primary Examiner.*

U.S. Cl. X.R.

209—74, 121